US008467087B2

(12) United States Patent
Sprague et al.

(10) Patent No.: US 8,467,087 B2
(45) Date of Patent: Jun. 18, 2013

(54) METHOD AND SYSTEM FOR REDUCING MATERIALS USAGE ASSOCIATED WITH DOCUMENT PRINTING

(75) Inventors: Mary Ann Sprague, Macedon, NY (US); Mary Catherine McCorkindale, Fairport, NY (US); Patricia L. Swenton-Wall, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 974 days.

(21) Appl. No.: 12/543,096

(22) Filed: Aug. 18, 2009

(65) Prior Publication Data

US 2011/0043846 A1 Feb. 24, 2011

(51) Int. Cl.
   G06K 15/02 (2006.01)
   G06F 3/12 (2006.01)
   G06K 15/00 (2006.01)
   H04N 1/40 (2006.01)

(52) U.S. Cl.
   USPC ......... 358/1.2; 358/1.13; 358/1.14; 358/1.15; 358/1.18; 358/3.23

(58) Field of Classification Search
   USPC .............. 358/1.2, 1.13, 1.14, 1.15, 1.18, 3.23
   See application file for complete search history.

(56) References Cited

U.S. PATENT DOCUMENTS

| 7,259,874 | B2 * | 8/2007 | Nishikawa et al. ............ 358/1.1 |
| 7,359,083 | B2 | 4/2008 | Salgado |
| 2004/0017577 | A1 | 1/2004 | Ostrover et al. |
| 2005/0160194 | A1 * | 7/2005 | Bango et al. ...................... 710/8 |
| 2005/0262441 | A1 | 11/2005 | Yoon |
| 2006/0082803 | A1 | 4/2006 | Nishikawa et al. |
| 2006/0173722 | A1 | 8/2006 | Mizutani |
| 2007/0127961 | A1 | 6/2007 | Han et al. |
| 2007/0171459 | A1 | 7/2007 | Dawson et al. |
| 2007/0258097 | A1 | 11/2007 | Nishikawa et al. |
| 2007/0273895 | A1 * | 11/2007 | Cudd et al. ..................... 358/1.1 |
| 2008/0021880 | A1 | 1/2008 | Ren et al. |
| 2008/0225336 | A1 | 9/2008 | Dawson et al. |
| 2009/0273806 | A1 | 11/2009 | Nishikawa et al. |
| 2010/0251104 | A1 | 9/2010 | Massand |
| 2011/0043831 | A1 | 2/2011 | Sprague et al. |
| 2011/0194135 | A1 | 8/2011 | Hamilton et al. |

OTHER PUBLICATIONS http://www.printgreener.com/.

* cited by examiner

*Primary Examiner* — Twyler Haskins
*Assistant Examiner* — Jonathan Beckley
(74) *Attorney, Agent, or Firm* — Fox Rothschild LLP

(57) ABSTRACT

A system for performing a print job request includes a processor, a printing device, and a computer-readable storage medium in communication with the processor. The computer-readable storage medium includes one or more programming instructions for receiving a print job request having a first set of one or more printing parameters, identifying a final page of the print job request, determining a measurement for the final page through the processor, determining a threshold measurement through the processor based on a second set of one or more printing parameters, determining through the processor whether to remove the final page from the print job request based on the measurement and the threshold measurement, removing the final page from the print job request in response, and performing the print job request through the printing device to yield a printed document. The print job request pertains to information displayed on a web site.

17 Claims, 3 Drawing Sheets

METHOD AND SYSTEM FOR REDUCING MATERIALS USAGE ASSOCIATED WITH DOCUMENT PRINTING

CROSS REFERENCE TO RELATED APPLICATIONS

This application is related to U.S. patent application Ser. No. 12/543,182 filed Aug. 18, 2009.

BACKGROUND

This document describes methods and systems for reducing the printing of unnecessary pages from web sites and similar sources.

Print job requests are often associated with printing parameters that affect the size of the output of the request, particularly in terms of paper usage. Commonly used printing parameters include font selection, font size, font style and spacing options. While a print job request with a large font size and style and increased spacing options may be aesthetically pleasing, such a request often results in an increased amount of paper usage.

Global awareness of environmental issues has led to increased concern regarding the amount of carbon or equivalent emissions being released into the atmosphere. A measurement of these emissions is generally referred to as a carbon footprint. The amount of paper that a company uses directly relates to its carbon footprint. As such, companies and users are looking for an environmentally friendly option that reduces paper usage and the resulting carbon footprint.

Files describing web pages often include embedded copyrighted information and/or carriage returns at the end of the file. In some cases, the user does not require such information to be included. In fact, many users end up throwing away the last page or last few pages when printing out information from a web page.

Current applications have user selectable print options, such as an option to "fit on one page" that scales the output to fit a specified page size. Such a print option can greatly reduce the text size and result in a document that is more difficult to read. Alternatively, manual editing can allow a user to select different font sizes and other print options in order to reduce paper usage. These options are commonly available in word processing, spreadsheet and other software applications. However, these options do not solve the problem associated with printing unnecessary pages from web sites.

SUMMARY

This disclosure is not limited to the particular systems, devices and methods described, as these may vary. The terminology used in the description is for the purpose of describing the particular versions or embodiments only, and is not intended to limit the scope. For example, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. As used herein, the term "comprising" means "including, but not limited to."

In an embodiment, a system for performing a print job request includes a processor, a printing device, and a computer-readable storage medium in communication with the processor. The computer-readable storage medium includes one or more programming instructions for receiving a print job request having a first set of one or more printing parameters, In an embodiment, a method of performing a print job request includes receiving a print job request having a first set of one or more printing parameters from a server, identifying a final page of the print job request, through the processor determining a measurement for the final page, determining through the processor a threshold measurement based on a second set of one or more printing parameters, determining through the processor whether to remove the final page from the print job request based on the measurement and the threshold measurement, removing the final page from the print job request responsive to the determining whether to remove the final page, and performing the print job request through a printing device to yield a printed document. The print job request pertains to information displayed on a web site.

In an embodiment, a method of printing a print job request include determining through a processor one or more first print job requests associated with a user, determining through the processor a user threshold measurement based on the first print job requests, receiving a second print job request from the user with a second set of one or more printing parameters, identifying a final page of the second print job request, determining through the processor a measurement on the final page, through the processor determining whether to

BRIEF DESCRIPTION OF THE DRAWINGS

Aspects, features, benefits and advantages of the present application will be apparent with regard to the following description and accompanying drawings, of which.

DETAILED DESCRIPTION

The following terms shall have, for the purposes of this application, the meanings set forth below.

For the purposes of the discussion below, a "printing device" is an electronic device that is capable of receiving commands and printing text and/or images on a substrate. Printing devices may include, but are not limited to, network printers, production printers, A "page" refers to a discrete portion of a document that can be embodied on a single substrate used by a printing device. The substrate may be a sheet of paper and/or the like.

A "line" refers to a discrete unit of measured distance in a vertical orientation of a web page. A line may include a group of text that has the same vertical placement on a web page.

Figure 1:
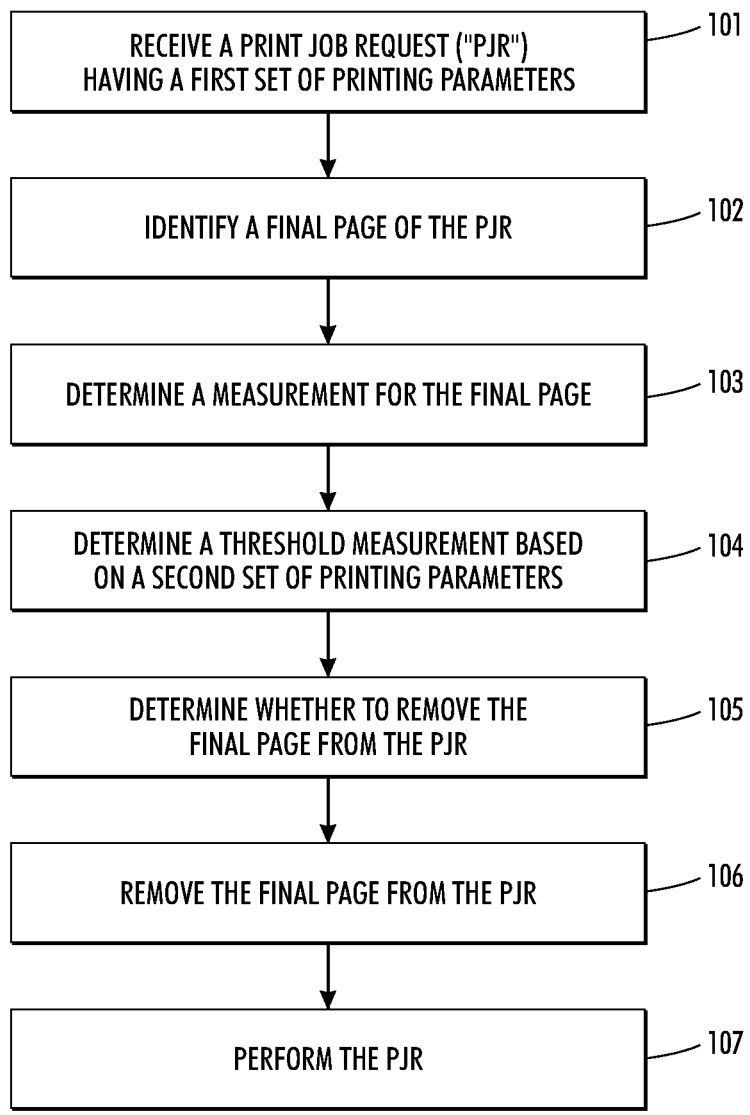
FIG. 1 depicts a flow diagram of an exemplary method of performing a print job request according to an embodiment.

FIG. 1 depicts a flow diagram of an exemplary method of performing a print job request according to an embodiment. As shown in FIG. 1, a print job request having a first set of printing parameters may be received 101 from a server. Printing parameters may include font, format, text size and/or the like. Additional and/or alternate types of printing parameters may also be used within the scope of this disclosure. The print job request may pertain to information displayed on a web site and/or the like. A user may be presented with a selection of printing parameters, wherein the user selected set of printing parameters may be sent to a server.

A final page of the print job request may be identified 102. In an embodiment, a count of a total number of pages associated with an expected print job output based on a first set of printing parameters may include a last page. The last page of the total number of pages associated with the expected print job output of the print job request may be the final page of the print job request. Additional and/or alternate types of identification techniques may also be used within the scope of this disclosure.

A measurement for the final page may be determined 103. In an embodiment, the measurement may include a number of lines, or distance from the top or top margin, printed on the final page. In another embodiment, the measurement may include a percentage of space used on the final page for printing purposes. Printing purposes may include a page bearing printed materials. For example, the measurement may be 25% utilization of a set printable area of the final page. Additional and/or alternate types of measurements may also be used within the scope of this disclosure.

A threshold measurement based on a second set of one or more printing parameters may be determined 104. In an embodiment, the threshold measurement may include a number of lines, or distance from the top or top margin, printed for a page. In another embodiment, the threshold measurement may include a percentage of space used on a page for printing purposes. Printing purposes may include a page bearing printed materials. For example, the threshold measurement may be 25% utilization of a set printable area of a page. Additional and/or alternate types of threshold measurements may also be used within the scope of this disclosure.

A determination of whether to remove the final page from the print job request may be performed 105 based on the measurement and the threshold measurement. In an embodiment, determining 105 whether to remove the final page from the print job request may include determining to print the final page using the first set of printing parameters if the measurement on the final page is greater than or equal to the threshold measurement. For example, the threshold measurement may be set to 10 lines, meaning that it is not desired to print a final page containing less than 10 printed lines. The measurement on the final page may be 15 lines. In this case, the final page may be printed using the first set of printing parameters. Additional and/or alternate types of measurements and threshold measurements may also be used within the scope of this disclosure. The shrink-to-fit algorithm may be applied automatically, or the user may be given the opportunity to accept or reject a reduced page count. Optionally, the modification may only be done if the original print job request would have resulted in printing on an odd number of document sides. This option may be considered when duplex printing is planned, because reducing one printed side from a duplex-printed job having an even number of printed document sides would not have yielded any reduction in paper usage.

Alternately, determining 105 whether to remove the final page from the print job request may include determining whether the measurement on the final page is less than the threshold measurement. Responsive to the determining 105 whether to remove the final page from the print job request, the final page may be removed 106 from the print job request.

In an embodiment, determining 105 whether to remove the final page from the print job request may include determining whether the measurement on the final page is less than the threshold measurement, and automatically truncating the final page in response to the measurement on the final page being less than the threshold measurement. For example, the threshold measurement may be set to 10 lines, meaning that it is not desired to print a final page containing less than 10 printed lines. The measurement on the final page may be 5 lines. In such a case, the final page may be automatically truncated. Additional and/or alternate types of measurements and threshold measurements may also be used within the scope of this disclosure.

Alternately, determining 105 whether to remove the final page from the print job request may include determining whether the measurement on the final page is less than the threshold measurement, and automatically setting a duplex printing parameter of the first set of one or more printing parameters in response to the measurement on the final page being less than the threshold measurement. For example, the threshold measurement may be set to 10 lines, meaning that it is not desired to print a final page containing less than 10 printed lines. The measurement on the final page may be 5 lines. In such a case, a duplex printing parameter of the first set of one or more printing parameters may be set to remove the final page.

In an embodiment, determining 105 whether to remove the final page from the print job request may include determining whether the measurement on the final page is less than the threshold measurement, and automatically deleting one or more lines from the final page in response to the measurement on the final page being less than the threshold measurement. For example, the threshold measurement may be set to 10 lines, meaning that it is not desired to print a final page containing less than 10 printed lines. The measurement on the final page may be 5 lines. In such a case, one or more lines from the final page may be deleted to remove the final page.

The print job request may be performed 107 to yield a printed document. In an embodiment, the print job request may be performed 107 on a printing device. Additional and/or alternate types of performance of the second print job request may also be used within the scope of this disclosure.

Figure 2:
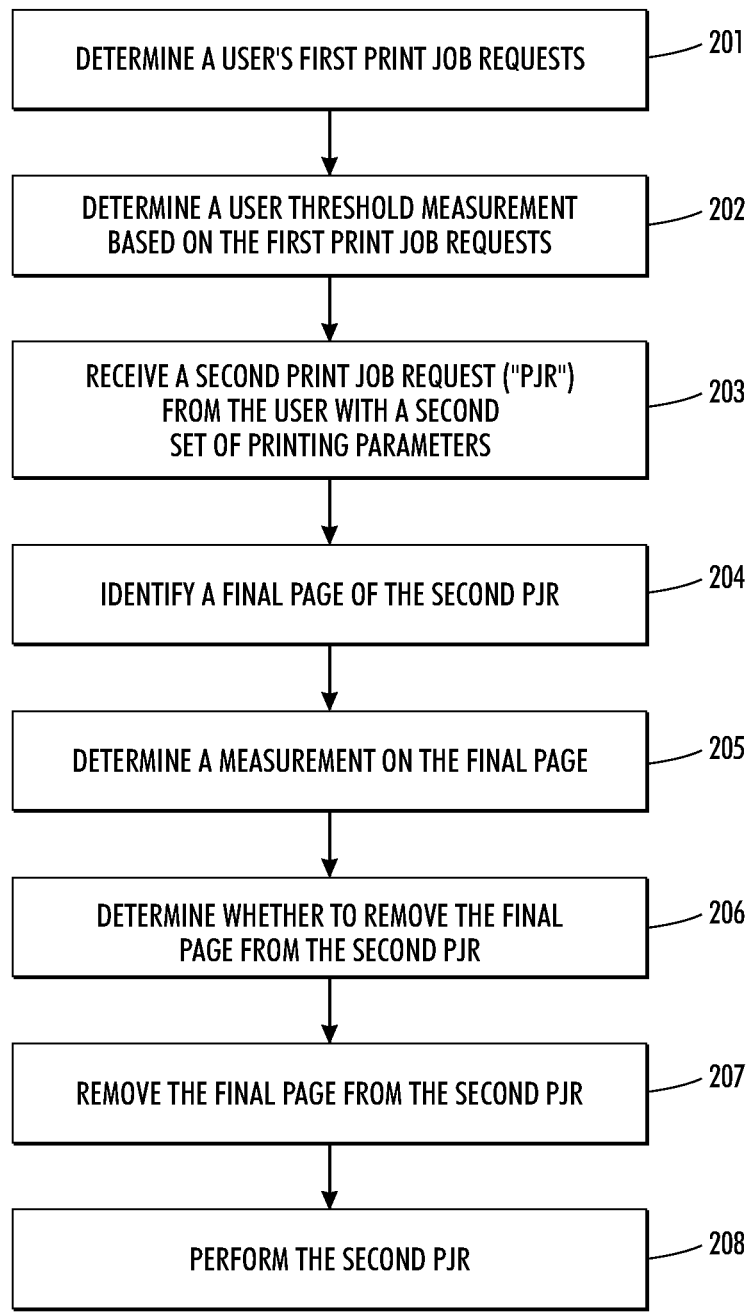
FIG. 2 depicts a flow diagram of an exemplary method of printing a print job request received from a user having a history of first print job requests according to an embodiment.

FIG. 2 depicts a flow diagram of an exemplary method of printing a print job request received from a user having a history of previous print job requests according to an embodiment. As shown in FIG. 2, one or more first print job requests associated with a user may be determined 201. Each of the first print job requests may include an associated set of one or more printing parameters. Printing parameters may include font, format, text size and/or the like. Additional and/or alternate types of printing parameters may also be used within the scope of this disclosure.

A user threshold measurement based on the first print job requests may be determined 202. In an embodiment, the user threshold measurement may include a number of A second print job request with a second set of printing parameters may be received 203 from the user. A user may be presented with a selection of printing parameters, from which the user selects the second set of printing parameters. Additional and/or alternate types of user selection of printing parameters may also be used within the scope of this disclosure.

A final page of the second print job request may be identified 204. In an embodiment, a total number of pages associated with an expected print job output based on a second set of printing parameters may include a last page. The last page associated with the expected print job output of the second print job request may be the final page of the second print job request. Additional and/or alternate types of identification techniques may also be used within the scope of this disclosure.

A measurement on the final page may be determined 205. In an embodiment, the measurement may include a number of lines printed on the final page. In another embodiment, the measurement may include a percentage of space used on the final page for printing purposes. Printing purposes may include a page bearing printed materials. For example, the measurement may be 25% utilization of a set printable area of the final page. Additional and/or alternate types of measurements may also be used within the scope of this disclosure.

A determination as to whether to remove the final page from the second print job request may be made 206 based on the measurement and the user threshold measurement. Determining 206 whether to remove the final page from the second print job request may include determining whether the measurement on the final page is less than the user threshold measurement. Responsive to the determining 206 whether to remove the final page from the second print job request, the final page may be removed 207 from the second print job request.

In an embodiment, determining 206 whether to remove the final page from the second print job request may include determining whether the measurement on the final page is less than the threshold measurement, and automatically truncating the final page in response to the measurement on the final page being less than the threshold measurement. For example, the user threshold measurement may be set to 10 lines, meaning that it is not desired to print a final page containing less than 10 printed lines. The measurement on the final page may be 5 lines. Accordingly, the final page may be automatically truncated. Additional and/or alternate types of measurements and threshold measurements may also be used within the scope of this disclosure.

Alternatively, determining 206 whether to remove the final page from the second print job request may include determining whether the measurement on the final page is less than the threshold measurement, and automatically setting a duplex printing parameter of the second set of one or more printing parameters in response to the measurement on the final page being less than the threshold measurement. For example, the user threshold measurement may be set to 10 lines, meaning that it is not desired to print a final page containing less than 10 printed lines. In such a case, the measurement on the final page may be 5 lines. A duplex printing parameter of the second set of one or more printing parameters may be set to remove the final page.

Alternatively, determining 206 whether to remove the final page from the second print job request may include determining whether the measurement on the final page is less than the threshold measurement, and automatically deleting one or more lines from the final page in response to the measurement on the final page being less than the threshold measurement. For example, the user threshold measurement may be set to 10 lines, meaning that it is not desired to print a final page containing less than 10 printed lines. The measurement on the final page may be 5 lines. As such, one or more lines from the final page may be deleted to remove the final page.

The second print job request may be performed 208 to yield a printed document. In an embodiment, the second print job request may be performed 208 on a printing device. Additional and/or alternate types of performance of the second print job request may also be used within the scope of this disclosure.

Figure 3:
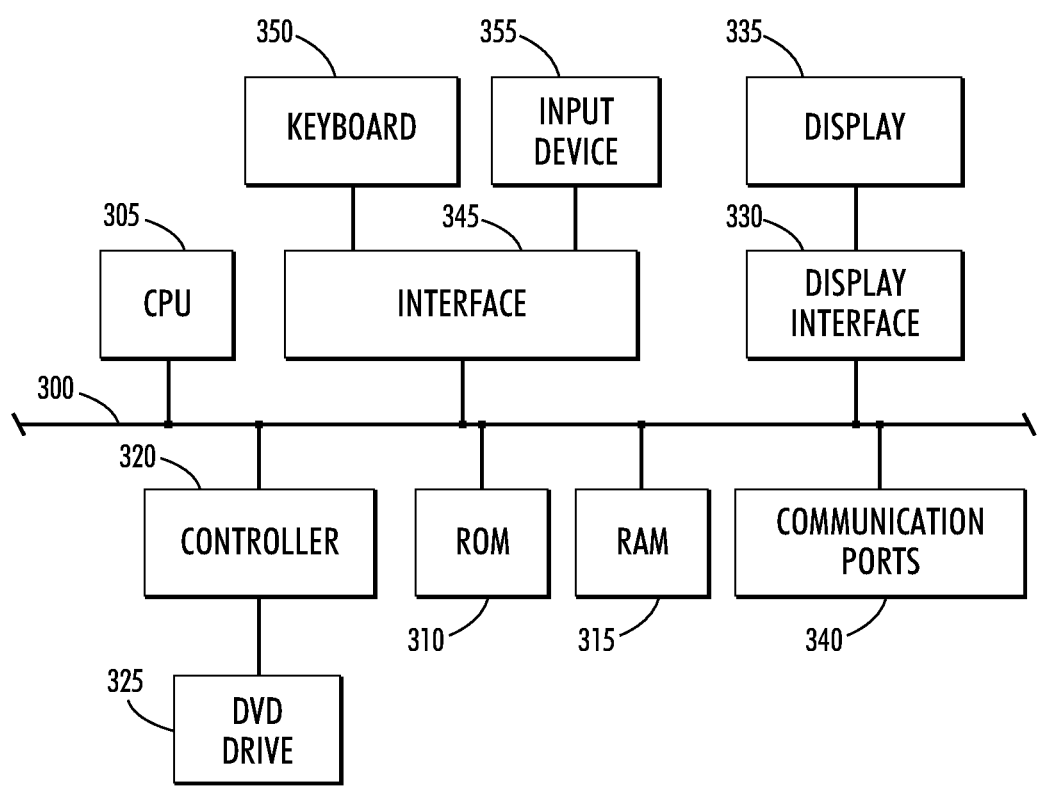
FIG. 3 illustrates an exemplary printing device for performing a print job request according to an embodiment.

FIG. 3 depicts a block diagram of an exemplary system that may be used to contain or implement program instructions for incentivizing remote servicing. Referring to FIG. 3, the exemplary system may include internal hardware which may be used to contain or implement program instructions according to an embodiment. A bus 300 serves as the main inform highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

An output device may communicate with the processor. Further, a computer-readable storage medium including one or more programming instructions may communicate with the processor. A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Programming instructions may be stored in the ROM 310 and/or the RAM 315. Optionally, program instructions may be stored on a tangible computer-readable storage medium such as a compact disk, a digital disk, flash memory, a memory card, a USB drive, an optical disc storage medium, such as Blu-ray™ disc, and/or other recording medium.

An optional display interface 330 may permit information from the bus 300 to be displayed on a display 335 in audio, visual, graphic or alphanumeric format. Communication with external devices may occur using various communication ports 340. An exemplary communication port 340 may be attached to a communications network, such as the Internet or an intranet. Information detailing the one or more updates to printing parameters may, for example, be displayed on an output device. In an embodiment, displaying such information may include causing the information to be displayed on printing devices, display devices and/or the like. Additional and/or alternate output devices may be utilized within the scope of this disclosure.

The hardware may also include an interface 345 which allows for receipt of data from input devices such as a keyboard 350 or other input device 355 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for performing a print job request, comprising:
 a processor;
 a printing device; and
 a computer-readable storage medium in communication with the processor, wherein the computer-readable storage medium includes one or more programming instructions for:
  receiving a print job request having a first set of one or more printing parameters, wherein the print job request pertains to information displayed on a web site,
  identifying a final page of the print job request,
  determining, via the processor, a measurement for the final page, determining, via the processor, a threshold measurement based on a second set of one or more printing parameters, determining, via the processor, whether to remove the final page from the print job request based on the measurement and the threshold measurement, wherein the determining includes:

determining whether the measurement on the final page is less than the threshold measurement, and automatically setting a duplex printing parameter of the first set of one or more printing parameters in response to the measurement on the final page being less than the threshold measurement;

responsive to the determining whether to remove the final page from the print job request, removing the final page from the print job request, and performing, via the printing device, the print job request to yield a printed document.

2. The system of claim 1, wherein the one or more programming instructions for determining a measurement for the final page comprise one or more programming instructions for determining a number of lines printed on the final page.

3. The system of claim 1, wherein the one or more programming instructions for determining a measurement for the final page comprise one or more programming instructions for determining a percentage of space used on the final page bearing printed material.

4. The system, of claim 1, wherein the one or more programming instructions for determining a threshold measurement based on a second set of one or more printing parameters comprise one or more programming instructions for determining a number of lines printed on the final page.

5. The system of claim 1, wherein the one or more programming instructions for determining a threshold measurement based on a second set of one or more printing parameters comprise one or more programming instructions for determining a percentage of space used on the final page bearing printed material.

6. The system of claim 1, wherein the one or more programming instructions for determining whether to remove the final page from the print job request comprise one or more programming instructions for:

determining whether the measurement on the final page is less than the threshold measurement;

automatically truncating the final page in response to the measurement on the final page being less than the threshold measurement.

7. The system of claim 1, wherein the one or more programming instructions for determining whether to remove the final page from the print job request comprise one or more programming instructions for:

determining whether the measurement on the final page is less than the threshold measurement;

automatically deleting one or more lines from the final page in response to the measurement on the final page being less than the threshold measurement.

8. A method of performing a print job request, the method comprising:

receiving a print job request having a first set of one or more printing parameters from a server, wherein the print job request pertains to information displayed on a web site;

identifying a final page of the print job request;

determining, via the processor, a measurement for the final page;

determining, via the processor, a threshold measurement based on a second set of one or more printing parameters;

determining, via the processor, whether to remove the final page from the print job request based on the measurement and the threshold measurement, wherein the determining includes automatically setting a duplex printing parameter of the first set of one or more printing parameters in response to the measurement on the final page being less than the threshold measurement;

removing the final page from the print job request responsive to the determining whether to remove the final page; and performing, via a printing device, the print job request to yield a printed document.

9. The method of claim 8, wherein determining a measurement for the final page comprises determining a number of lines printed on the final page.

10. The method of claim 8, wherein determining a measurement for the final page comprises determining a percentage of space used on the final page bearing printed material.

11. The method of claim 8, wherein determining a threshold measurement based on a second set of one or more printing parameters comprises determining a number of lines printed on the final page.

12. The method of claim 8, wherein determining a threshold measurement based on a second set of one or more printing parameters comprises determining a percentage of space used on the final page bearing printed material.

13. The method of claim 8, wherein determining whether to remove the final page from the print job request comprises:

determining whether the measurement on the final page is less than the threshold measurement;

automatically truncating the final page in response to the measurement on the final page being less than the threshold measurement.

14. The method of claim 8, wherein determining whether to remove the final page from the print job request comprises:

determining whether the measurement on the final page is less than the threshold measurement;

automatically deleting one or more lines from the final page in response to the measurement on the final page being less than the threshold measurement.

15. A method of printing a print job request, the method comprising:

determining, via a processor, one or more first print job requests associated with a user, wherein each first print job request comprises an associated set of one or more printing parameters;

determining, via the processor, a user threshold measurement based on the first print job requests;

receiving a second print job request from the user with a second set of one or more printing parameters, wherein the print job request comprises information displayed on a web site;

identifying a final page of the second print job request;

determining, via the processor, a measurement on the final page;

determining, via the processor, whether to remove the final page from the second print job request based on the measurement and the user threshold measurement, wherein the determining includes:

determining whether the measurement on the final page is less than the threshold measurement, and automatically setting a duplex of the first set of one or more printing parameters in response to the measurement on the final page being less than the threshold measurement;

removing the final page from the second print job request responsive to the determining whether to remove the final page; and performing, via a printing device, the second job request to yield a printed document.

16. The method of claim 15, wherein determining whether to remove the final page from the second print job request comprises:
   determining whether the measurement on the final page is less than the threshold measurement;
   automatically truncating the final page in response to the measurement on the final page being less than the threshold measurement.

17. The method of claim 15, wherein determining whether to remove the final page from the second print job request comprises:
   determining whether the measurement on the final page is less than the threshold measurement;
   automatically deleting one or more lines from the final page in response to the measurement on the final page being less than the threshold measurement.

* * * * *